United States Patent
Williams et al.

(10) Patent No.: US 11,647,419 B2
(45) Date of Patent: May 9, 2023

(54) ADJUSTING WINDOW SIZE BASED ON QUALITY OF EXPERIENCE

(71) Applicant: T-Mobile USA, Inc., Bellevue, WA (US)

(72) Inventors: Carl Williams, Maple Valley, WA (US); Wafik Abdel Shahid, Kenmore, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/835,598

(22) Filed: Mar. 31, 2020

(65) Prior Publication Data
US 2021/0306902 A1    Sep. 30, 2021

(51) Int. Cl.
| | |
|---|---|
| H04W 28/02 | (2009.01) |
| H04W 28/16 | (2009.01) |
| H04W 80/02 | (2009.01) |
| H04L 69/322 | (2022.01) |
| H04W 28/06 | (2009.01) |

(52) U.S. Cl.
CPC ........ *H04W 28/0278* (2013.01); *H04L 69/322* (2013.01); *H04W 28/0268* (2013.01); *H04W 28/06* (2013.01); *H04W 28/16* (2013.01); *H04W 80/02* (2013.01)

(58) Field of Classification Search
CPC ......... H04W 28/0278; H04W 28/0268; H04W 28/06; H04W 80/02; H04W 28/16; H04L 69/322
See application file for complete search history.

(56) References Cited

U.S. PATENT DOCUMENTS

| | | | | |
|---|---|---|---|---|
| 2010/0246602 A1* | 9/2010 | Barreto | ................... | H04L 69/10 370/476 |
| 2011/0276699 A1* | 11/2011 | Pedersen | ............... | H04L 47/781 709/227 |
| 2013/0114408 A1* | 5/2013 | Sastry | ..................... | H04L 47/37 370/231 |
| 2013/0272121 A1* | 10/2013 | Stanwood | ............. | H04L 47/824 370/230 |
| 2016/0050646 A1* | 2/2016 | Wang | ..................... | H04W 72/04 455/450 |
| 2016/0174209 A1* | 6/2016 | Park | ....................... | H04W 72/02 370/329 |
| 2017/0078918 A1* | 3/2017 | He | ..................... | H04W 28/0205 |

(Continued)

OTHER PUBLICATIONS

"LCP Mapping Restrictions," Nokia, Ericsson, Fujitsu, Nokia Shanghai Bell, 3GPP TSG-RAN WG2 Meeting #109e, R2-1909118, Elbonia, Feb. 24-Mar. 6, 2020, 2 pages.

(Continued)

Primary Examiner — Lakeram Jangbahadur
(74) Attorney, Agent, or Firm — Lee & Hayes, P.C.

(57) ABSTRACT

Various systems, methods, and devices for adjusting window size based on QoE sensitivity are described. An example method includes receiving, from a first device, a data packet that indicates a window size and that is addressed to a second device. The example method further includes identifying a QoE priority associated with the second device and adjusting the window size based on the QoE priority. Further, the example method includes transmitting the data packet to the second device.

20 Claims, 9 Drawing Sheets

(56) References Cited

U.S. PATENT DOCUMENTS

| | | | |
|---|---|---|---|
| 2017/0215122 A1* | 7/2017 | Nigam | H04W 88/10 |
| 2017/0324795 A1* | 11/2017 | Ashida | H04L 47/10 |
| 2017/0374579 A1* | 12/2017 | Wang | H04W 28/0278 |
| 2018/0070249 A1* | 3/2018 | Godley | H04W 88/16 |
| 2019/0020594 A1* | 1/2019 | Dhanabalan | H04L 47/6255 |
| 2019/0158371 A1* | 5/2019 | Dillon | H04L 43/087 |
| 2019/0288877 A1* | 9/2019 | Babbellapati | H04W 88/16 |
| 2020/0280871 A1* | 9/2020 | Khirallah | H04W 28/0263 |
| 2020/0351198 A1* | 11/2020 | Majmundar | H04L 43/0805 |
| 2021/0250808 A1* | 8/2021 | Mitra | H04W 76/28 |

OTHER PUBLICATIONS

"Regarding Fixed LCP Restrictions," 3GPP TSG-RAN WG2 Meeting #107bis, R2-1912845, R2-1909118, Chongqing, China, Oct. 14-18, 2019, 2 pages.

* cited by examiner

ADJUSTING WINDOW SIZE BASED ON QUALITY OF EXPERIENCE

BACKGROUND

Modern terrestrial telecommunication systems include heterogeneous mixtures of 2nd, 3rd, and 4th Generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include 5th Generation (5G) cellular-wireless access technologies to provide improved bandwidth and decreased response times to a multitude of devices that may be connected to a network.

Various technologies associated with telecommunication systems enable prioritized delivery of services that are sensitive to Quality of Experience (QoE) metrics, such as latency, packet loss, throughput, Bit Error Rates (BERs), and the like. For example, Radio Access Networks (RANs) and/or core networks may preferentially transmit QoE-sensitive data over reserved network resources, such as dedicated bearers. However, existing techniques for prioritizing QoE-sensitive data may not satisfy the strict QoE requirements for some services, such as the latency requirements of Ultra Reliable Low Latency Communications (URLLCs).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
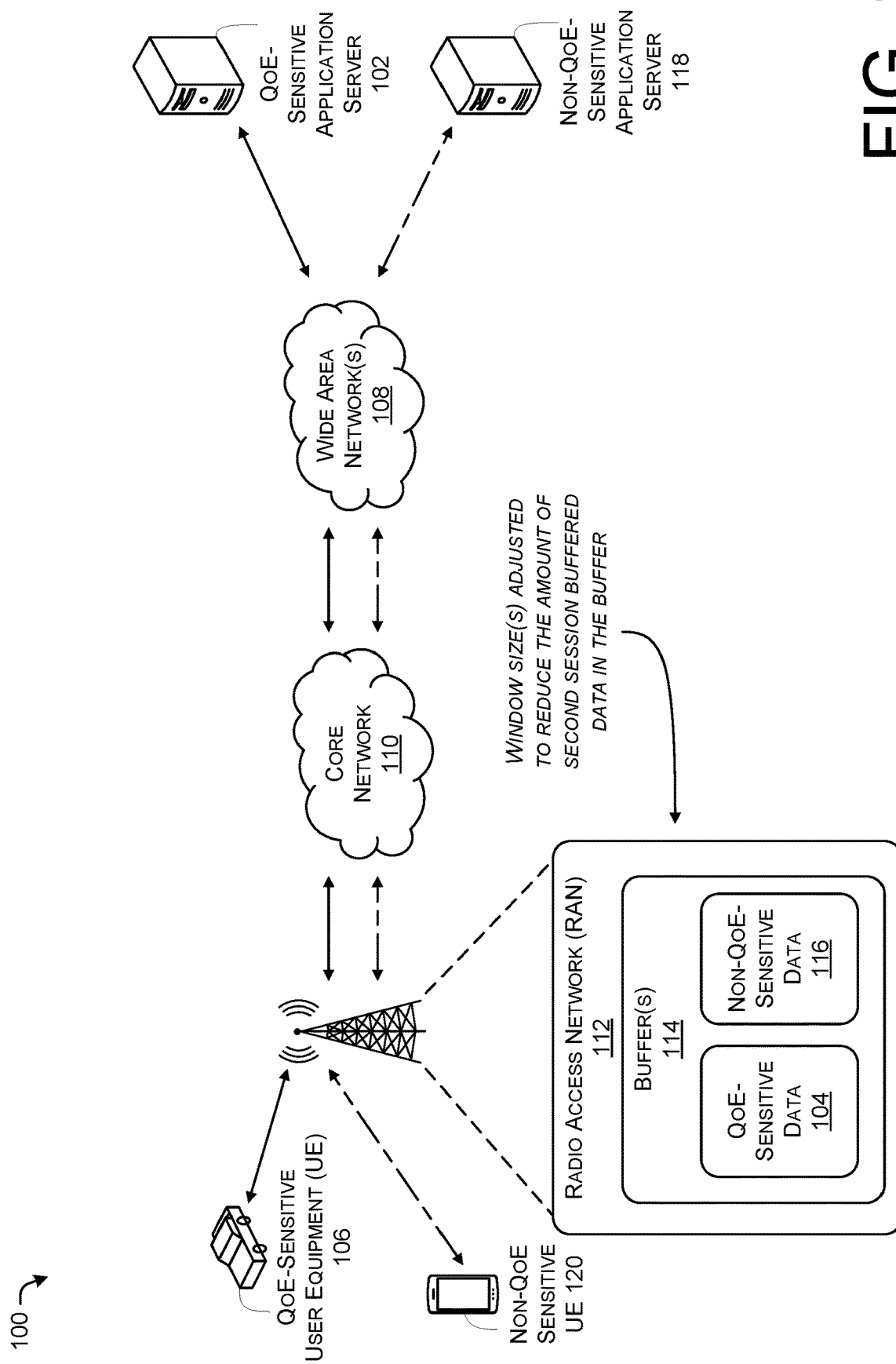
FIG. 1 illustrates an example environment for adjusting window sizes based on Quality of Experience (QoE) sensitivity.

The systems, devices, and techniques described herein relate to various techniques for adjusting window size of data packets based on Quality of Experience (QoE) sensitivity.

Although some known techniques can be used to prioritize the delivery of QoE-sensitive data through delivery networks, one significant throughput bottleneck is at the Radio Access Network (RAN) level. A RAN may receive data streams, buffer the data temporarily, and distribute the data to various User Equipment (UEs) attached to the RAN over air interfaces. The RAN may prioritize the resources of some air interfaces for QoE-sensitive data. However, when the buffer is full or near capacity, the QoE of the QoE-sensitive data may be reduced regardless of whether the data is transmitted over dedicated radio bearers. For instance, latency-sensitive data may be slowed down regardless of whether the latency-sensitive data is transmitted over a dedicated radio bearer. Further, even if the data was delivered to the RAN over dedicated bearers through an associated core network, the buffer at the RAN may nevertheless reduce the QoE of the QoE-sensitive data during delivery.

Various implementations of the present disclosure include techniques for prioritizing buffer resources for QoE-sensitive data. According to particular examples, components in the RAN and/or the associated core network may be configured to adjust window sizes of data transmitted through the RAN and/or the core network, in order to prioritize buffer resources for QoE-sensitive data. The window sizes may be, for instance, Transmission Control Protocol (TCP) window sizes. In some cases, the window sizes of non-QoE-sensitive data may be reduced in order to reduce the amount of the non-QoE-sensitive data stored in the buffer. Further, in some examples, the window sizes of QoE-sensitive data may be increased in order to increase throughput of the QoE-sensitive data through the RAN and core network. Accordingly, delivery delays of the QoE-sensitive data due to a congested buffer at the RAN may be prevented.

Adjusting the window size of data is different than transmitting data over dedicated bearers, or other existing Guaranteed Bit Rate (GBR) transmission mechanisms. A dedicated bearer, for instance, refers to reserved communication resources within a RAN and/or core network over which some data (e.g., GBR data) is transmitted. In contrast, various implementations of the present disclosure provide techniques for reducing the amount of transmitted data temporarily stored at a shared resource (e.g., a buffer) within the RAN. Thus, in some cases, two data streams transmitted over the same dedicated bearer traversing the same RAN and/or core network can be delivered with different QoEs, if they have different adjusted window sizes. As a result, implementations described herein can provide improved QoE control over delivered services.

Various implementations of the present disclosure are directed to improvements in the technical field of telecommunications. By adjusting window sizes according to the examples described herein, QoE associated with the delivery of QoE-sensitive data can be reduced in real-world delivery networks. Embodiments of the present disclosure will now be described with reference to the accompanying figures.

FIG. 1 illustrates an example environment 100 for adjusting window sizes based on QoE sensitivity. As used herein, the term "QoE," and its equivalents, can refer to a metric that can impact how delivered data is perceived by a user. For instance, QoE metrics can include latency, packet loss, throughput, Bit Error Rates (BERs), and the like. Data may be considered "QoE-sensitive" when delivery of the data has a guaranteed QoE metric, or a QoE metric associated with the delivery of the data may significantly impact QoE. A QoE-sensitive application server 102 may store and provide data associated with a QoE-sensitive application. As used herein, the term "application server," and its equivalents, can refer to a device that provides data (e.g., application-related data) to another device. The QoE-sensitive application may refer to software and/or hardware configured to perform operations and distribute data that is QoE-sensitive to one or more end-users. Some examples of data and/or services that are QoE-sensitive can include Ultra-Reliable Low-Latency Communications (URLLCs), or any other data that is associated with a threshold End-to-End (E2E) delay requirement. Some additional examples of data and/or services that are QoE-sensitive include services associated with one or more particular Quality of Service (QoS) Class Identifiers (QCIs), Guaranteed Bit Rate (GBR) services, services with greater than a threshold priority, services associated with less than a threshold packet delay budget, or the like. In some cases, QoE-sensitive applications can be arbitrarily defined. For instance, a telecommunications service provider may designate a particular preferred application as a QoE-sensitive application, in order to ensure that users will experience minimal delays when accessing the preferred application.

As illustrated in FIG. 1, the QoE-sensitive application server 102 may provide QoE-sensitive data 104 to a QoE-sensitive User Equipment (UE) 106. In some examples, the QoE-sensitive data 104 may be transmitted to the UE 106 in the form of a data stream. The QoE-sensitive data 104 may be transmitted in a session between the QoE-sensitive application server 102 and the QoE-sensitive UE 106. As used herein, the term "session," and its equivalents, can refer to a transmission of data between two endpoints or nodes. The QoE-sensitive data 104 may include data associated with one or more particular QCIs, GBR data, data associated with greater than a threshold priority, data associated with less than a threshold packet delay budget, or the like. The term "GBR data," or its equivalents, can refer to a designation for data that are delivered via a guaranteed bandwidth or bit rate. GBR data may be QoS-sensitive data. For example, GBR data may include any of conversational voice data, conversational video (live streaming) data, real time gaming data, Vehicle-to-X (V2X) data, electricity distribution data, process automation (monitoring) data, non-conversational video (buffered streaming) data, mission critical user plane Push to Talk (PTT) voice data, non-mission-critical user plane PTT voice data, mission critical video user plane data, and certain V2X message data. In other examples, GBR data may include different types of QoS-sensitive data.

The terms "UE," "user device," "wireless communication device," "wireless device," "communication device," "mobile device," and "client device," can be used interchangeably to describe any UE that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of UEs can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network. In some examples, as depicted in FIG. 1, the QoE-sensitive UE 106 may be an autonomous vehicle that is controlled by the QoE-sensitive data 104.

The QoE-sensitive data 104 may be delivered from the QoE-sensitive application server 102 to the QoE-sensitive UE 106 over various intermediary networks, such as at least one Wide Area Network (WAN) 108, a core network 110, and a Radio Access Network (RAN) 112. The WAN(s) 108, for instance, may include the Internet or any other delivery network capable of transferring data to and from the QoE-sensitive application server 102.

As used herein, the term "core network," "carrier network," or their equivalents, can refer to an architectural framework for providing services to one or more UEs. That is, the core network 110 can include any computing devices implementing various aspects of one or more of 2nd, 3rd, 4th, and 5th generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies. The core network 110 may include, but is not limited to, a combination of: serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data through the core network 110. While FIG. 1 illustrates the example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In some cases, the core network 110 may have an architecture defined by the 3rd Generation Partnership Project (3GPP). For example, the core network 110 may include an Evolved Packet Core (EPC), a 5G Core (5GC), or the like. In some examples, various components of the 5GC can include, but are not limited to, a Network Exposure Function (NEF), a Network Resource Function (NRF), an Authentication Server Function (AUSF), an Access and Mobility management Function (AMF), a Policy Control Function (PCF), a Session Management Function (SMF), a Unified Data Management (UDM) function, a User Plane Function (UPF), and/or an Application Function (AF). Each entity, gateway, server, and function in the 5G core network can be implemented by specialized hardware (e.g., one or more devices), general hardware executing specialized software (e.g., at least one virtual machine executed on one or more devices), or the like.

In some instances, the core network 110 can include, or be connected to, an IP Multimedia Subsystem (IMS) core (sometimes referred to as an "IMS core network," an "IMS network" or an "IM core network Subsystem"). IMS is an architectural framework defined by 3GPP for delivering Internet Protocol (IP) multimedia to a UE. The IMS core can be maintained and/or operated by one or more service providers, such as one or more wireless carriers ("carriers"), that provide IMS-based services to a user who is associated with the UE. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be included in the IMS network.

The terms "RAN," "base station," "access point (AP)," or their equivalents, can refer to one or more devices that can transmit and/or receive wireless services to and from one or more UEs in a coverage area. For example, a base station can be implemented as a variety of technologies to provide wired and/or wireless access to the network, as discussed herein. In some instances, a base station can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, a base station can include any number and type of transceivers and/or base stations representing any number and type of macrocells, microcells, picocells, or femtocells, for example, with any type or amount of overlapping coverage or mutually exclusive coverage.

The RAN 112 may communicate with various UEs in an associated coverage area over one or more radio interfaces (also referred to as "radio bearers" and "air interfaces"). In some examples, the RAN 112 may be configured to transmit and/or receive data from a single UE via a single radio interface or multiple radio interfaces (e.g., a "dual bearer). In some cases, the radio interface(s) may include at least one dedicated radio bearer, which may be reserved for the transmission of data carrying QoE-sensitive services.

The RAN 112 may include at least one buffer 114, which may be used to at least temporarily store the QoE-sensitive data 104 before the RAN 112 delivers the QoE-sensitive data 104 to the QoE-sensitive UE 106 over a radio interface. That is, the buffer(s) 114 may store no more than a threshold amount of data at a given time. Further, as the amount of data stored in the buffer(s) 114 increases, the QoE at which the RAN 112 may transfer the data over radio interfaces may also increase. Accordingly, the transfer of the QoE-sensitive data 104 through the RAN 112 may be delayed if the buffer(s) 114 store more than a threshold amount of data.

In addition to the QoE-sensitive session between the QoE-sensitive application server 102 and the QoE-sensitive UE 106, a non-QoE sensitive session may include the transfer of non-QoE sensitive data 116 between a non-QoE-sensitive application server 118 and a non-QoE sensitive UE 120. The non-QoE-sensitive application server 118 may store and provide data associated with an application that is not significantly sensitive to QoE. The non-QoE-sensitive application include software and/or hardware configured to perform operations and distribute data that is non-QoE-sensitive to one or more end-users. For instance, the non-QoE sensitive data 116 may omit URLLC data, GBR data, or any data without specific QoE requirements. That is, the non-QoE sensitive data 116 may include non-URLLC data, non-GBR data, or the like.

The term "non-GBR data," or its equivalents, can refer to data that can be delivered via any available bandwidth or bit rate, or are otherwise not guaranteed a bandwidth or bit rate. Non-GBR data may be QoS-insensitive, or at least less QoS-sensitive than GBR data. For example, non-GBR data may include any of Internet Protocol (IP) Multimedia Subsystem (IMS) signaling data, Transmission Control Protocol (TCP)-based video (buffered streaming) data, voice data, video (live streaming) data, interactive gaming data, Mission Critical delay sensitive signaling data, Mission Critical Data (MCD), certain V2X message data, augmented reality data, and Low-latency Enhanced Mobile Broadband (eMBB) applications data. In other examples, non-GBR data may include different types of relatively QoS-insensitive data. For instance, the non-QoE sensitive data 116 may include web browsing data.

Like the QoE-sensitive data 104, the non-QoE-sensitive data 116 may be transferred through the WAN(s) 108, the core network 110, and the RAN 112. Further, the non-QoE sensitive data 116 may be temporarily stored in the buffer(s) 114, along with the QoE-sensitive data 104. Accordingly, the non-QoE-sensitive data 116 may delay the delivery of the QoE-sensitive data 104 through the RAN 112, due to its the occupation of the buffer(s) 114. The delays associated with the RAN 112 delivering the QoE-sensitive data 104 may be decreased by reducing the amount of the non-QoE-sensitive data 116 that is stored in the buffer(s) 114.

According to various implementations of the present disclosure, the window size associated with the non-QoE-sensitive data 116 may be decreased, which may thereby decrease the amount of the non-QoE-sensitive data 116 in the buffer(s) 114. A component within the E2E path between the non-QoE sensitive UE 120 and the non-QoE-sensitive application server 118 may identify the non-QoE-sensitive data 116 as being relatively insensitive to QoE and may decrease a window size associated with the non-QoE sensitive data 116. For example, at least a portion of the core network 110 and/or the RAN 112 may adjust a window size of the non-QoE-sensitive data 116.

As used herein, the terms "window size," "window," and their equivalents, may refer to an amount of data that can be transferred from a source to a destination before the source expects an acknowledgement of the data from the destination. An example session may include the transfer of data between the source and the destination. The destination may transmit, to the source, an indication of a window size that is acceptable to the destination. The window size may correspond to a maximum amount of data that the destination can temporarily hold (e.g., an amount of a receive buffer of the destination that has been reserved for the session).

In response to identifying the window size, the source may transmit a portion of the data to the destination, wherein an amount of the portion of data is no more than the window size. In some cases, the window size can be acknowledged in a window size parameter of a Protocol Data Unit (PDU) and/or data packet. The PDU and/or data packet may include the indication of the window size and/or at least a part of the portion of data. One example of a window size parameter is the Transmission Control Protocol (TCP) window size parameter, which can be incorporated into a TCP/Internet Protocol (IP) data packet or other type of PDU. Upon receiving the portion of the data, the destination may transmit, to the source, an acknowledgement of the portion of the data. Once the source receives the acknowledgement, the source may proceed to transmit an additional portion of the data to the destination. In some cases, the acknowledgement may include an indication of another window size, which the source may use to limit the amount of the additional portion of the data sent to the destination. The source may refrain from transmitting the additional portion of the data until it receives the acknowledgement from the destination. For instance, the source may retransmit the original portion of the data if it does not receive the acknowledgement from the destination within a particular time period after the original portion of the data is transmitted (e.g., within the Round Trip Time (RTT)).

According to various implementations, an entity (e.g., a "window adjustment system") within the core network 110 and/or the RAN 112 may receive a PDU from the non-QoE-sensitive UE 120, which may indicate a window size associated with the non-QoE-sensitive session. The entity may determine that the non-QoE-sensitive session is relatively insensitive to QoE. For instance, the entity may identify the non-QoE-sensitive application server 118 as a destination for the PDU and look up an entry associated with the non-QoE-sensitive application server 118 within a database. The database may be stored locally at the entity, or accessible by the entity via an intermediary network. The entry may indicate that the delivery of the non-QoE-sensitive session can be deprioritized, such as when the network is congested. For example, the entry may indicate that the data associated with the non-QoE-sensitive session is non-URLLC data, non-GBR data, or the like. In some cases, the database may omit an entry associated with the non-QoE-sensitive application server 118. Accordingly, the entity may determine that the non-QoE-sensitive data 116 can be deprioritized due to an entry associated with the non-QoE-sensitive application server 118 or the absence of the entry in the database.

In some cases, the entity may rewrite a window size parameter within the PDU in order to decrease the window size of the non-QoE-sensitive session. For example, the window size parameter may be a TCP window size parameter. The window size parameter may indicate a maximum number of bytes that are to be transmitted by the non-QoE-sensitive application server 118 before the non-QoE-sensitive application server 118 expects to receive an acknowledgement from the non-QoE-sensitive UE 120. The entity may modify the window size parameter to reflect a reduced window size and forward the PDU along the path between the non-sensitive UE 120 and the non-QoE-sensitive application server 118. Accordingly, the reduced window size may decrease the amount of the non-QoE-sensitive data 116 stored in the buffer(s) 114.

According to some examples, the entity may renegotiate the window size associated with the non-QoE-sensitive session by exchanging messages requesting and/or confirming a proposed window size with the non-QoE-sensitive UE 120 and/or the non-QoE-sensitive application server 118. For example, the entity may transmit, to the non-QoE-sensitive UE 120, a request for a proposed window size that is smaller than the original window size in the PDU. The non-QoE-sensitive UE 120 may confirm or provide another window size, which is acceptable to the non-QoE-sensitive UE 120, to the entity. Accordingly, the adjusted window size may be expected and/or acceptable to the non-QoE-sensitive UE 120 and the non-QoE-sensitive application server 118.

Although decreasing the window size associated with the non-QoE-sensitive session may decrease the overall throughput of the non-QoE-sensitive data 116 in the session, the any reduction in QoS of the data may be negligible to the non-QoE-sensitive UE 120 due to the insensitivity of the transmitted services to QoE. On the other hand, the throughput of the QoE-sensitive data 104 may significantly increase, because the reduced window size may reduce the amount of the non-QoE-sensitive data 116 in the buffer(s) 114, thereby providing increased availability of space in the buffer(s) 114 for the QoE-sensitive data 104. Thus, the throughput of the QoE-sensitive data 104 may increase by reducing the window size associated with the non-QoE-sensitive data 116.

In some implementations, the entity may increase the window size associated with the QoE-sensitive data 104. For example, the entity may receive a PDU in the QoE-sensitive session, modify the window size parameter to reflect an increased window size, and forward the PDU along the path between the QoE-sensitive UE 106 and the QoE-sensitive application server 102. In some cases, the entity may negotiate the increased window size with the QoE-sensitive UE 106 and/or the QoE-sensitive application server 102.

In some cases, the entity may selectively modify the window size(s) of the QoE-sensitive data 104 and/or the non-QoE-sensitive data 116 in response to identifying network congestion within the environment 100. For example, the RAN 112 may determine that the buffer(s) 114 is congested by identifying that an amount of data occupying the buffer(s) 114 is greater than a threshold amount (e.g., 50%, 80%, 90%, or some other percentage of the capacity of the buffer(s) 114, etc.). In some cases, the RAN 112 may report the congestion to the entity (e.g., in the core network 110). In various cases, upon identifying that the buffer(s) 114 is congested, the entity may decrease the window size of the non-QoE-sensitive data 116 and/or increase the window size of the QoE-sensitive data 104.

Although examples described with respect to FIG. 1 are applicable to downlink communications (e.g., from the application servers 102 and 118 to the UEs 106 and 120), implementations are not so limited. For example, some implementations may be applicable to uplink communications (e.g., from the UEs 106 and 120 to the application servers 102 and 118) or to user-user communications (e.g., between the UEs 106 and 120).

Figure 2A:
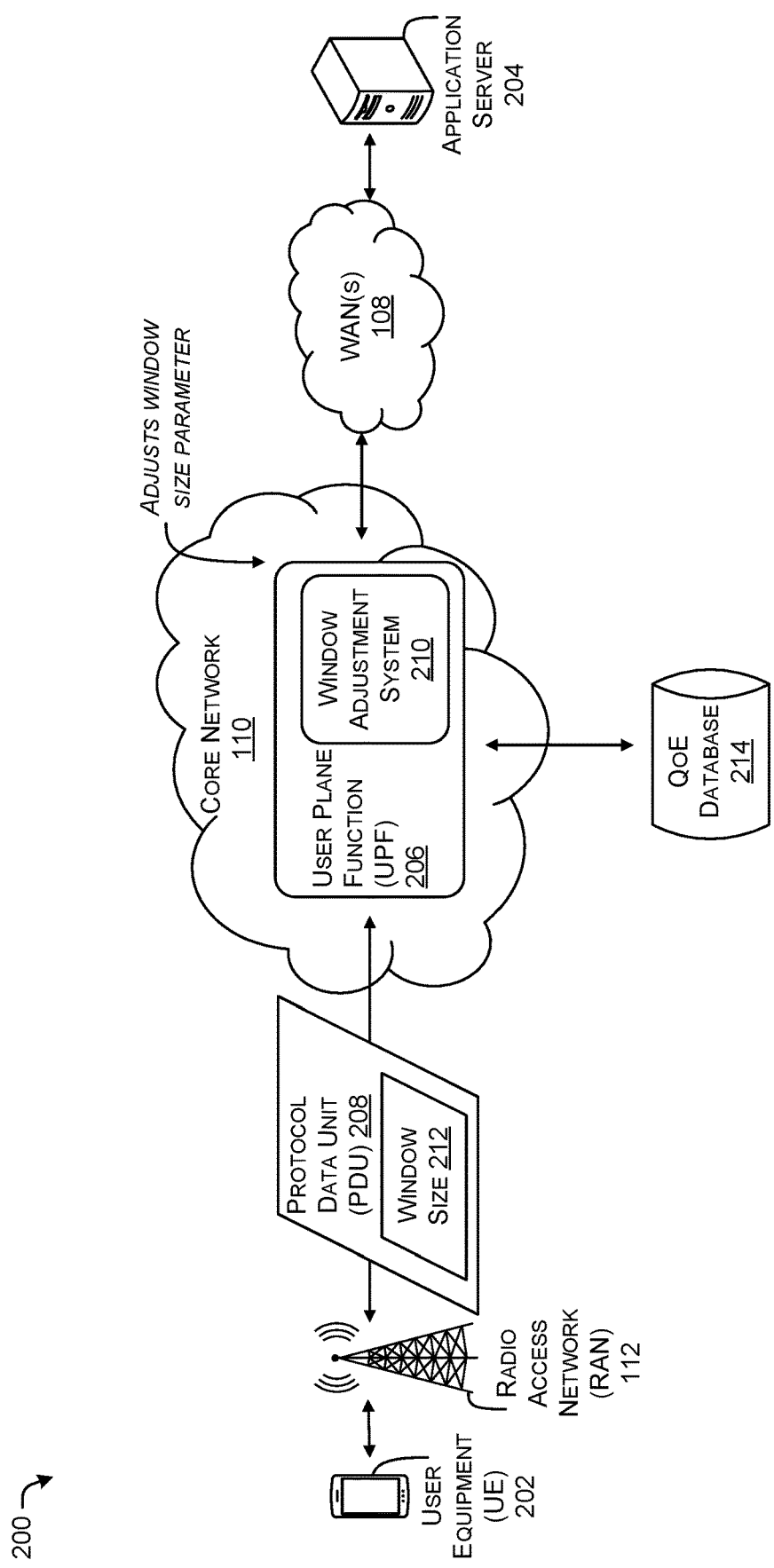
FIG. 2A illustrates an example environment in which a component of a core network adjusts window sizes, wherein the core network is a 5G Core (5GC).
Figure 2B:
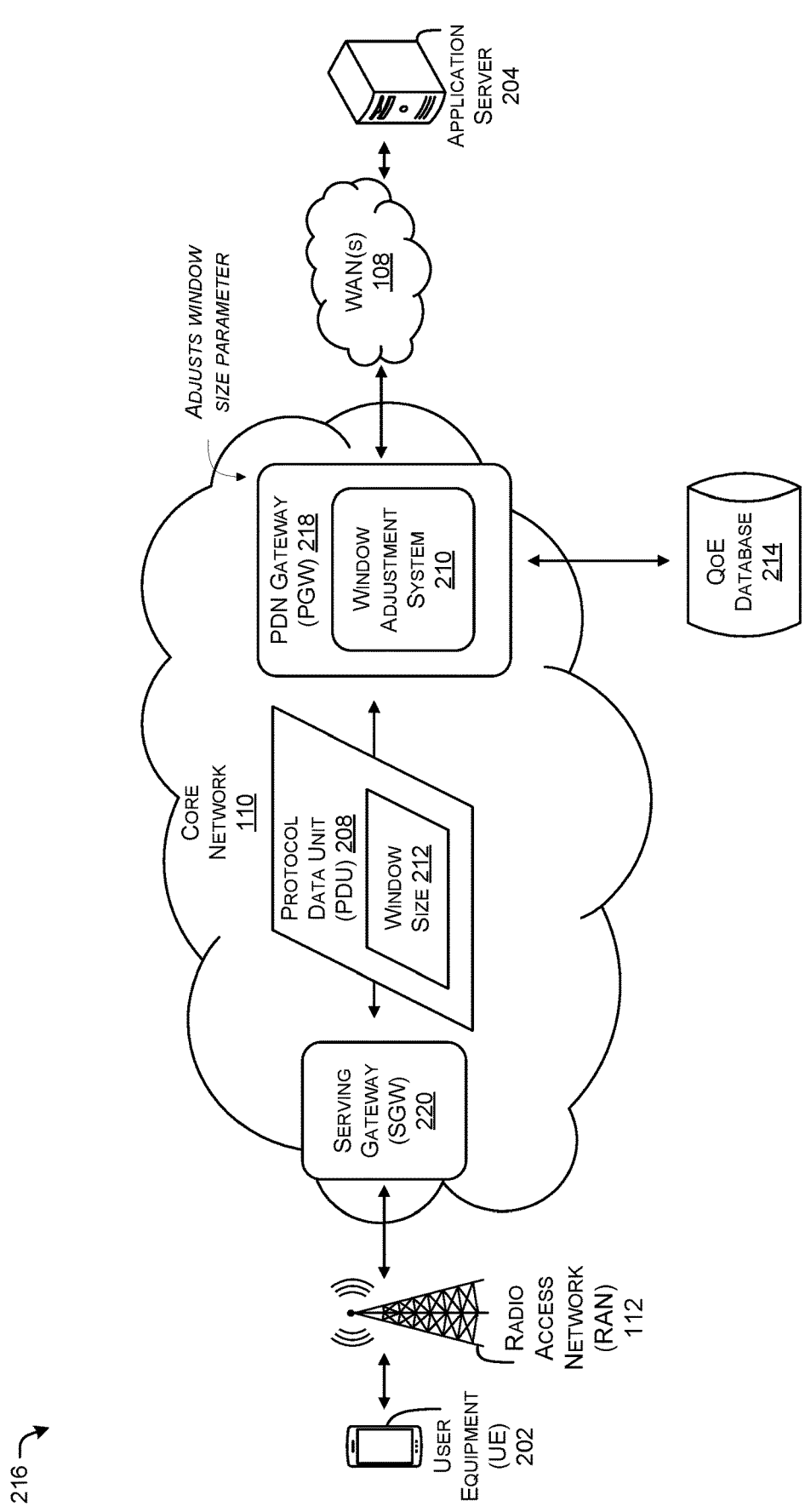
FIG. 2B illustrates an example environment in which a component of a core network adjusts window sizes, wherein the core network is an Evolved Packet Core (EPC).
Figure 2C:
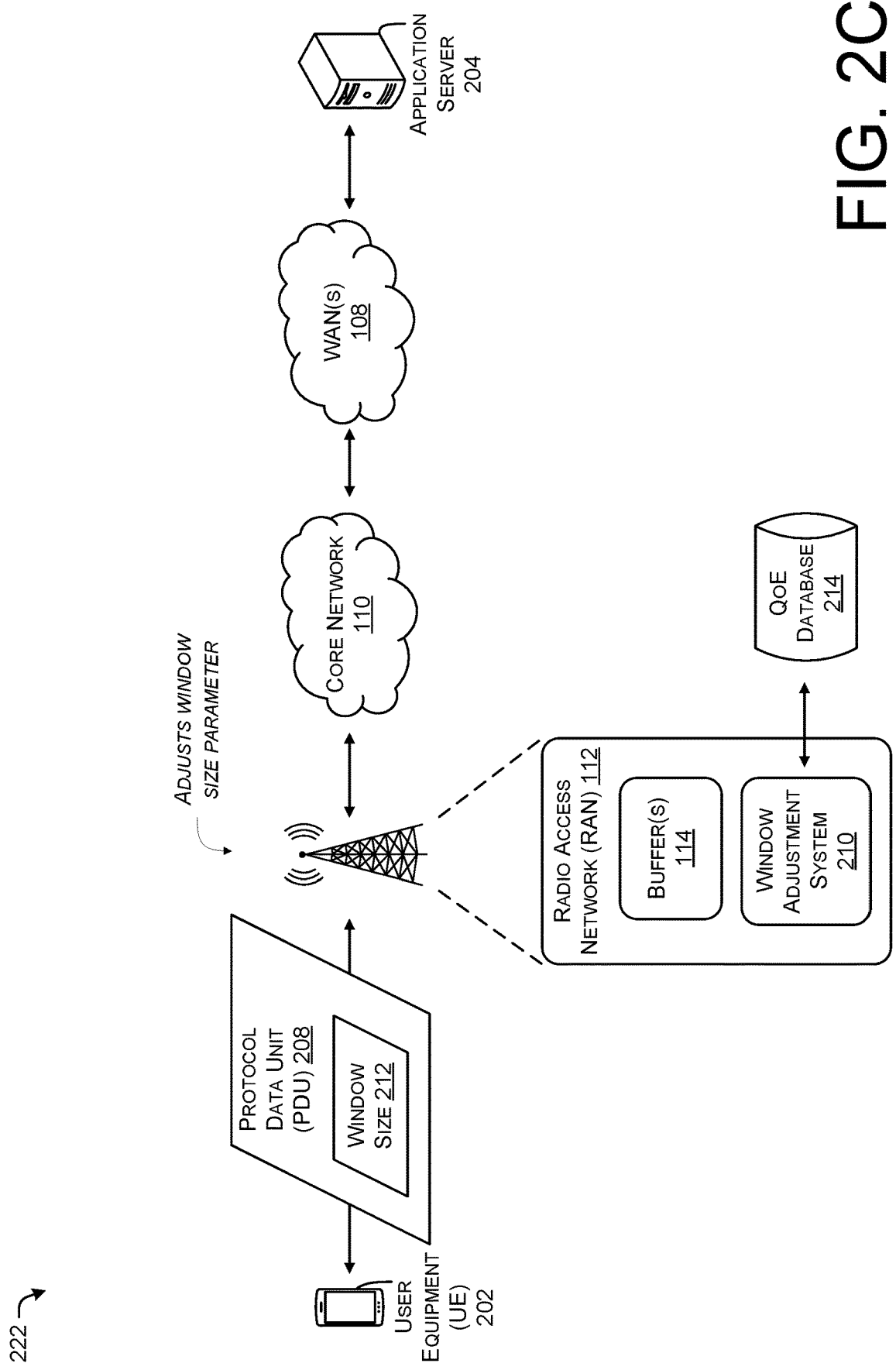
FIG. 2C illustrates an example environment in which a component of a Radio Access Network (RAN) adjusts window sizes.

FIGS. 2A to 2C illustrate various examples of environments by which components within the core network 110 and/or RAN 112 adjust window sizes based on QoE sensitivity.

FIG. 2A illustrates an example environment 200 in which a component of the core network 110 adjusts window sizes, wherein the core network 110 is a 5G Core (5GC). As illustrated, the environment 200 depicts a session between a User Equipment (UE) 202 and an application server 204. The UE 202 may be, for instance, the QoE-sensitive UE 106 or the non-QoE-sensitive UE 120 described above with reference to FIG. 1. The application server 204 may be, for example, the QoE-sensitive application server 102 or the non-QoE-sensitive application server 118 described above with reference to FIG. 1. The environment 200 may further include the WAN(s) 108, core network 110, and RAN 112 described above with reference to FIG. 1.

The core network 110 may include a User Plane Function (UPF) 206 that transfers data between the WAN(s) 108 and the RAN 112. In general, the UPF 206 can be implemented as a network function including functionality to control data transfer between the UE 110 and the various other components. In some instances, the UPF 206 can include functionality to act as an anchor point for radio access technology (RAT) handover (e.g., inter and intra), external protocol data unit (PDU) session point of interconnect to an external network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs, which are associated with the core network 110 and/or with the UE 202.

In various cases, the UPF 206 may receive a PDU 208 that is being transmitted between the UE 202 and the application server 204. In the environment 200 illustrated in FIG. 2A, the PDU 208 may be a Packet Data Convergence Protocol (PDCP) PDU. The PDU 208 may include a window size 212. The window size 212 may correspond to an amount (e.g., a number of bytes, a number of packets, or the like) of data that the UE 202 is expected to receive from the application server 204 before transmitting an acknowledgement to the application server 204.

The UPF 206 may include a window adjustment system 210, which may include software and/or hardware components. The window adjustment system 210 may be configured to identify a QoE sensitivity associated with the PDU 208. For example, the window adjustment system 210 may identify a session that includes the PDU 208 and may look up an entry associated with the session in a QoE database 214. In some cases, the window adjustment system 210 can be a virtual stack extension of TCP/UDP layers (transport) that will allow for adjustment of receive window size.

The QoE database 214 may store entries associated with various applications, sessions, and/or application servers. The entries may also indicate a QoE sensitivity associated with the applications, sessions, and/or application servers. For example, the QoE database 214 may store the entries in a hash table that is indexed according to application, session, and/or application server. In some cases, the QoE database 214 may be stored in the UPF 206 and/or some other entity within the core network 110. According to various examples, the UPF 206 can access the entries in the QoE database 214.

The QoE sensitivity of the PDU 208 may be indicated by a QoE priority, which is stored in the entry associated with the PDU 208. The QoE priority may be, for instance, a number whose magnitude corresponds to the sensitivity of the PDU 208, or the session associated with the PDU 208, to QoE. In some cases, the window adjustment system 210 may compare the QoE priority to a threshold and determine whether the PDU 208 corresponds to a QoE-sensitive session based on the comparison between the QoE priority and the threshold. For example, the window adjustment system may determine that the PDU 208 is associated with a non-QoE-sensitive session if the QoE priority is less than or equal to the threshold, and may determine that the PDU 208 is associated with a QoE-sensitive session if the QoE priority is greater than the threshold.

The window adjustment system 210 may modify the window size 212 based on the QoE sensitivity associated with the PDU 208. For example, the window adjustment system 210 may decrease the window size 212 if the PDU 208 is associated with a non-QoE-sensitive session. In some cases, the window adjustment system 210 may increase the window size 212 if the PDU 208 is associated with a QoE-sensitive session. The window adjustment system 210 may consequently forward the PDU 208 with the adjusted window size toward the destination of the PDU 208 (e.g., toward the UE 202 or the application server 204). Accordingly, a buffer within the RAN 112 may be prioritized for QoE-sensitive data transferred through the RAN 112.

FIG. 2B illustrates an example environment 216 in which a component of the core network 110 adjusts window sizes, wherein the core network 110 is an Evolved Packet Core (EPC). As illustrated, the environment 200 depicts a session between the UE 202 and the application server 204. The environment 216 may further include the WAN(s) 108, core network 110, and RAN 112 described above with reference to FIG. 1.

The core network 110 may include a Packet Data Network (PDN) Gateway (PGW) 218 and a Serving Gateway (SGW) 220, which may transfer data between the WAN(s) 108 and the RAN 112. The PGW 218 may include a component that handles user-plane data (PGW-U) and a component that handles control-plane data (PGW-C). The SGW 220 can include a component that handles user-plane data (SGW-U) and a component that handles control-plane data (SGW-C).

The PGW 218 may receive the PDU 208 that is being transmitted between the UE 202 and the application server 204. In various cases, the PDU 208 may be a GTP PDU. The PDU 208 may include the window size 212. The window size 212 may correspond to an amount (e.g., a number of bytes, a number of packets, or the like) of data that the UE 202 is expected to receive from the application server 204 before transmitting an acknowledgement to the application server 204.

The PGW 218 may include a window adjustment system 210, which may include software and/or hardware components. The window adjustment system 210 may be configured to identify a QoE sensitivity associated with the PDU 208. For example, the window adjustment system 210 may identify a session that includes the PDU 208 and may look up an entry associated with the session in a QoE database 214. In some cases, the window adjustment system 210 can be a virtual stack extension of TCP/UDP layers (transport) that will allow for adjustment of receive window size.

The QoE database 214 may store entries associated with various applications, sessions, and/or application servers. The entries may also indicate a QoE sensitivity associated with the applications, sessions, and/or application servers. For example, the QoE database 214 may store the entries in a hash table that is indexed according to application, session, and/or application server. In some cases, the QoE database 214 may be stored in the UPF 206 and/or some other entity within the core network 110. According to various examples, the PGW 218 can access the entries in the QoE database 214.

The QoE sensitivity of the PDU 208 may be indicated by a QoE priority, which is stored in the entry associated with the PDU 208. The QoE priority may be, for instance, a number whose magnitude corresponds to the sensitivity of the PDU 208, or the session associated with the PDU 208, to QoE. In some cases, the window adjustment system 210 may compare the QoE priority to a threshold and determine whether the PDU 208 corresponds to a QoE-sensitive session based on the comparison between the QoE priority and the threshold. For example, the window adjustment system may determine that the PDU 208 is associated with a QoE-sensitive session if the QoE priority is greater than or equal to the threshold, and may determine that the PDU 208 is associated with a non-QoE-sensitive session if the QoE priority is less than the threshold.

The window adjustment system 210 may modify the window size 212 based on the QoE sensitivity associated with the PDU 208. For example, the window adjustment system 210 may decrease the window size 212 if the PDU 208 is associated with a non-QoE-sensitive session. In some cases, the window adjustment system 210 may increase the window size 212 if the PDU 208 is associated with a QoE-sensitive session. The window adjustment system 210 may forward the PDU 208 with the adjusted window size toward the destination of the PDU 208 (e.g., toward the UE 202 or the application server 204). For instance, the PGW 218 may transmit the PDU 208 with the modified window size 212 to the SGW 220, which may forward the PDU 208 to the RAN 112. Accordingly, a buffer within the RAN 112 may be prioritized for QoE-sensitive data transferred through the RAN 112.

FIG. 2C illustrates an example environment 222 in which a component of the RAN 112 adjusts window sizes. As illustrated, the environment 222 depicts a session between the UE 202 and the application server 204. The environment 222 may further include the WAN(s) 108, core network 110, and RAN 112 described above with reference to FIG. 1.

The UE 202 may be attached to the RAN 112. The RAN 112 may receive the PDU 208 that is being transmitted between the UE 202 and the application server 204. In the environment 222 illustrated in FIG. 2C, the PDU 208 may be General Packet Radio Service (GPRS) Tunneling Protocol (GTP) PDU, if received by the RAN 112 from the core network 110, or the PDU 208 may be a PDCP PDU, if received by the RAN 112 from the UE 202. The PDU 208 may include a window size 212. The window size 212 may correspond to an amount (e.g., a number of bytes, a number of packets, or the like) of data that the UE 202 is expected to receive from the application server 204 before transmitting an acknowledgement to the application server 204.

The RAN 112 may include a window adjustment system 210, which may include software and/or hardware components. The window adjustment system 210 may be configured to identify a QoE sensitivity associated with the PDU 208. For example, the window adjustment system 210 may identify a session that includes the PDU 208 and may look up an entry associated with the session in a QoE database 214. In some cases, the window adjustment system 210 can be a virtual stack extension of TCP/UDP layers (transport) that will allow for adjustment of receive window size.

The QoE database 214 may store entries associated with various applications, sessions, and/or application servers. The entries may also indicate a QoE sensitivity associated with the applications, sessions, and/or application servers. For example, the QoE database 214 may store the entries in a hash table that is indexed according to application, session, and/or application server. In some cases, the QoE database 214 may be stored in the UPF 206 and/or some other entity within the core network 110. According to various examples, the UPF 206 can access the entries in the QoE database 214.

The QoE sensitivity of the PDU 208 may be indicated by a QoE priority, which is stored in the entry associated with the PDU 208. The QoE priority may be, for instance, a number whose magnitude corresponds to the sensitivity of the PDU 208, or the session associated with the PDU 208, to QoE. In some cases, the window adjustment system 210 may compare the QoE priority to a threshold and determine whether the PDU 208 corresponds to a QoE-sensitive session based on the comparison between the QoE priority and the threshold. For example, the window adjustment system may determine that the PDU 208 is associated with a QoE-sensitive session if the QoE priority is greater than or equal to the threshold and may determine that the PDU 208 is associated with a non-QoE-sensitive session if the QoE priority is less than the threshold.

The window adjustment system 210 may modify the window size 212 based on the QoE sensitivity associated with the PDU 208. For example, the window adjustment system 210 may decrease the window size 212 if the PDU 208 is associated with a non-QoE-sensitive session. In some cases, the window adjustment system 210 may increase the window size 212 if the PDU 208 is associated with a QoE-sensitive session. The window adjustment system 210 may forward the PDU 208 with the adjusted window size toward the destination of the PDU 208 (e.g., toward the UE 202 or the application server 204). Accordingly, the buffer(s) 114 within the RAN 112 may be prioritized for QoE-sensitive data transferred through the RAN 112.

Figure 3:
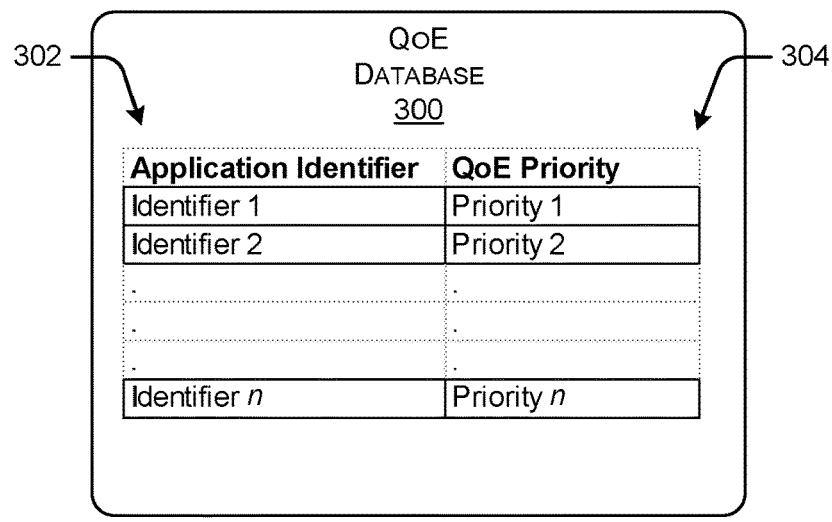
FIG. 3 illustrates an example of a QoE database.

FIG. 3 illustrates an example of a QoE database 300. As illustrated, the QoE database 300 can include a table with n entries, wherein n is a positive integer. Each of the entries in the QoE database 300 may include at least two elements: an application identifier 302 and a QoE priority 304.

The application identifier 302 may uniquely identify an application associated with a session. In some cases, the application identifier 302 can include an identity (e.g., an Internet Protocol (IP) address, a Media Access Control (MAC) address, or the like) of a server providing data associated with the application. The application identifier 302 can include a data element (number, string, or the like) that uniquely identifies the application of each entry, such that different application identifiers 302 within the QoE database 300 may identify different applications.

The QoE priority 304 may identify a QoE sensitivity of the data associated with the application. For example, the QoE priority 304 of an example entry may be a number that indicates a sensitivity of the corresponding application to QoE. In some cases, a lower number may correspond to a higher priority and a higher number may correspond to a lower priority, or vice versa.

For example, the first entry with Identifier 1 may correspond to an application server that provides data for controlling autonomous vehicles. Due to the high sensitivity of autonomous vehicle control data to QoE, the corresponding Priority 1 of the first entry may be a relatively high priority, such as "1." In contrast, the second entry with Identifier 2 may correspond to an application server that provides web browsing data. Due to the relative insensitivity of web browsing data to QoE, the corresponding Priority 2 of the second entry may be a relatively low priority, such as "10." In some cases, data associated with Identifier 1 may be identified as QoE-sensitive, and data associated with Identifier 2 may be identified as non-QoE-sensitive.

Figure 4:
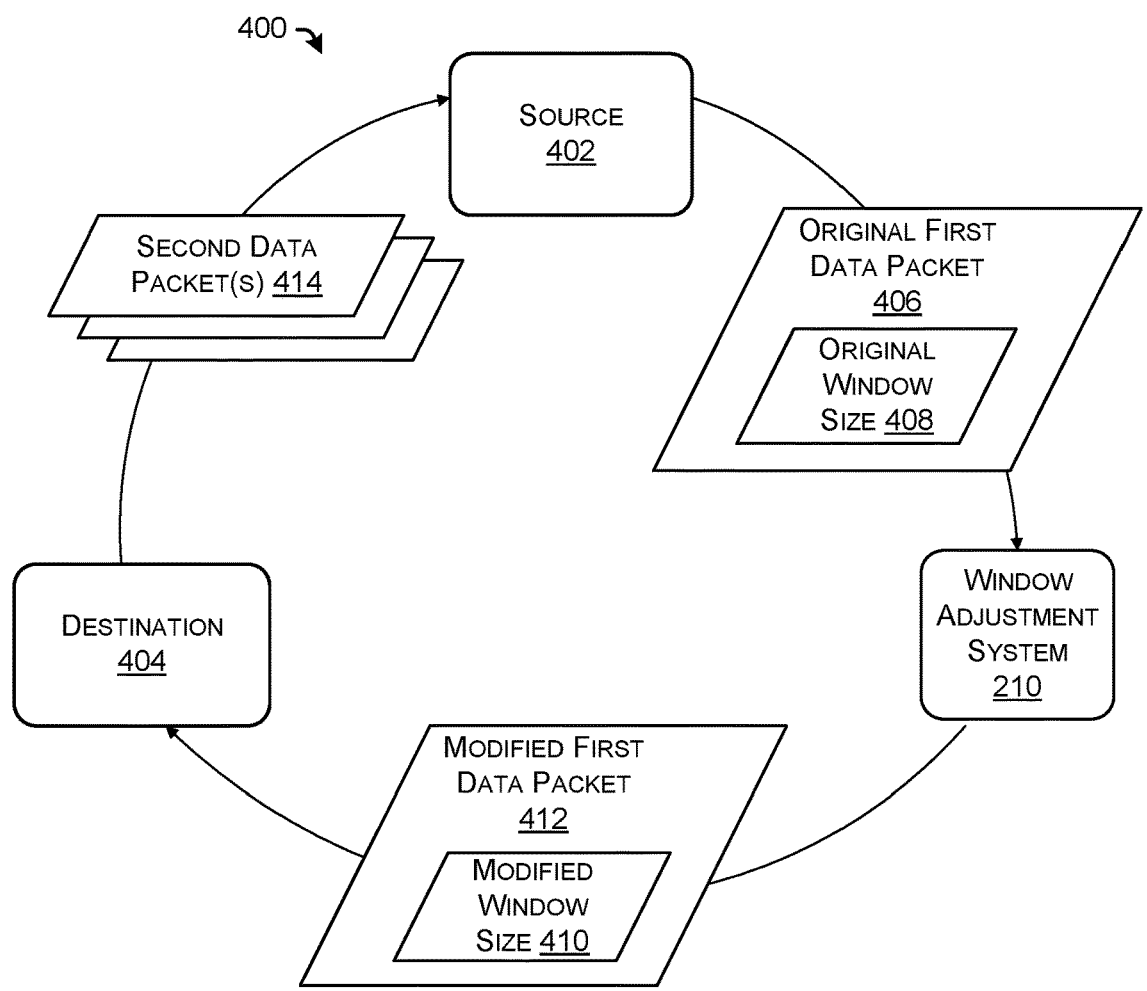
FIG. 4 illustrates example signaling for modifying a window size.

FIG. 4 illustrates example signaling 400 for modifying a window size. As illustrated, the signaling 400 involves the window adjustment system 210 described above with reference to FIGS. 2A to 2C. The signaling 400 may include a session between two endpoints: a source 402 and a destination 404. In some cases, the source 402 may be a UE (e.g., the QoE-sensitive UE 106, the non-QoE-sensitive UE 120, or the UE 202 described above) and the destination 404 may be a server (e.g., the QoE-sensitive application server 102, the non-QoE-sensitive server 118, or the application server 204 described above), or vice versa. In some cases, the source 402 and the destination 404 may be two different UEs.

The window adjustment system 210 may be in-line with the session between the source 402 and the destination 404. For example, the window adjustment system 210 may be included in a RAN attached to the source 402 and/or the destination 404. In some cases, the window adjustment system 210 may be included in a core network associated with a service provider of the source 402 and/or the destination 404. For example, the core network may be a 5GC and the window adjustment system 210 may be included in an UPF, the core network may be an EPC and the window adjustment system 210 may be included in a PGW, or the like.

In various implementations, the source 402 may transmit an original first data packet 406 toward the destination 404. The window adjustment system 210 may receive the original first data packet 406. Upon receiving the original first data packet 406, the window adjustment system 210 may identify a QoE sensitivity (e.g., a QoE priority) of an application associated with the source 402 and/or the destination 404. For instance, the window adjustment system 210 may look up the QoE sensitivity in a database.

The window adjustment system 210 may modify the original first data packet 406 based on the QoE sensitivity of the application. Specifically, the window adjustment system 210 may modify an original window size 408 of the original first data packet 406 based on the QoE sensitivity of the application. If the application is non-QoE-sensitive, the window adjustment system 210 may decrease the original window size 408. If the application is QoE-sensitive, the window adjustment system 210 may increase the original window size 408 and/or refrain from modifying the original window size 408. The modified version of the original window size 408 may be a modified window size 410, and the version of the original first data packet 406 with the modified window size 410 may be a modified first data packet 412. The window adjustment system 210 may transmit the modified first data packet 412 with the modified window size 410 to the destination 404.

According to various implementations, in response to receiving the modified first data packet 412, the destination 404 may transmit, to the source 402, at least one second data packet 414. A size (e.g., a number of bytes) of the second data packet(s) 414 may correspond to the modified window size 410. For example, the size of the second data packet(s) 414 may be no more than the modified window size 410.

Further, in some cases, the signaling 400 may be cyclical. For instance, upon receiving the second data packet(s) 414, the source 402 may transmit, to the destination 404, an acknowledgement (e.g., another original data packet 406). The acknowledgement can be received by the window adjustment system 210, and a window size (e.g., the original window size 408) can be adjusted based on a QoE sensitivity associated with the session. Thus, various implementations of the present disclosure can be used to modify window sizes of ongoing communication sessions between the source 402 and the destination 404.

Figure 5:
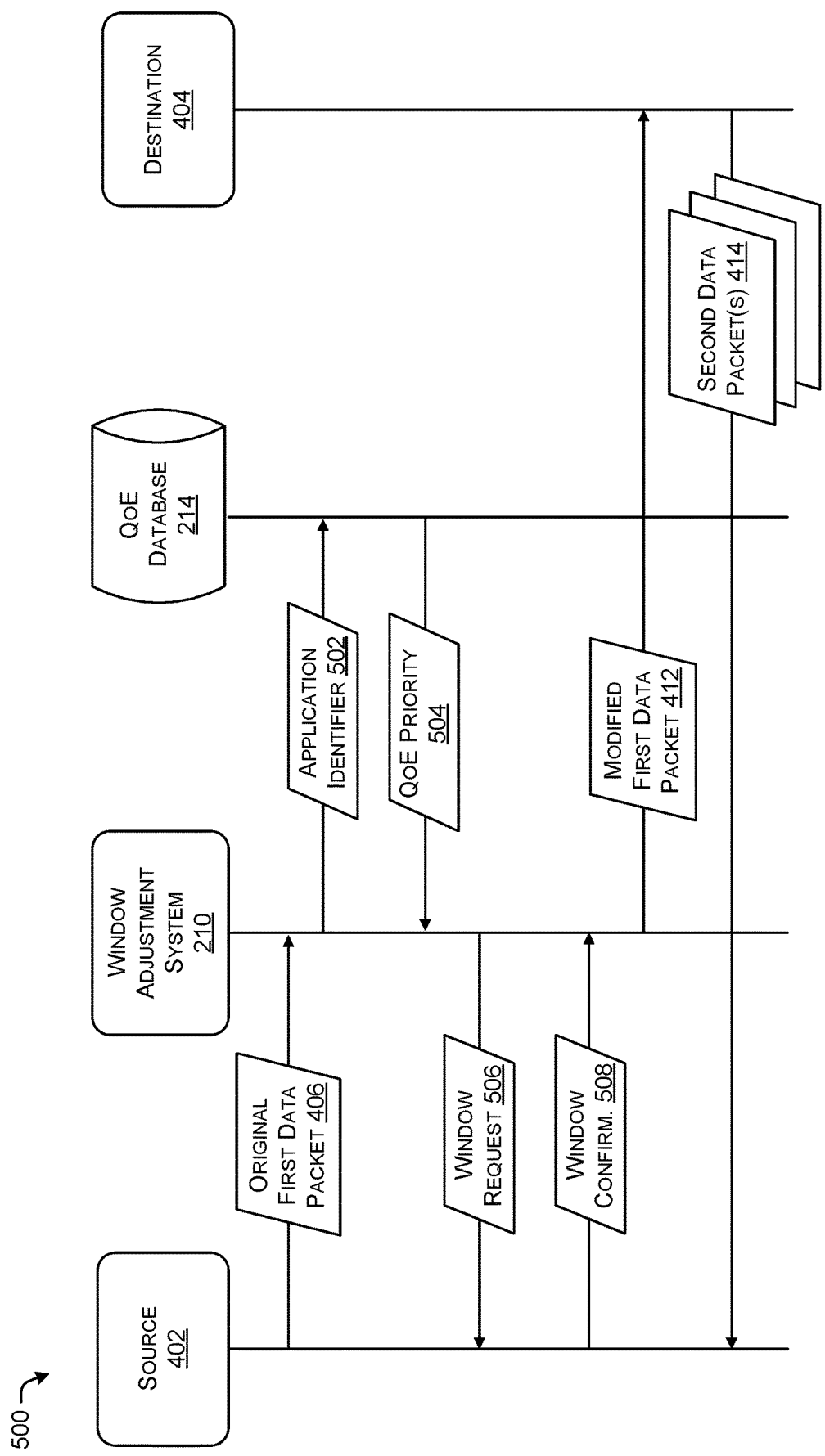
FIG. 5 illustrates example signaling for adjusting window size based on QoE sensitivity.

FIG. 5 illustrates example signaling 500 for adjusting window size based on QoE sensitivity. As illustrated, the signaling 500 is between the source 402, window adjustment system 210, QoE database 214, and destination 404, which are described above. Further, the signaling 500 includes the original first data packet 406, the modified first data packet 412, and the second data packet(s) 414 described above with reference to FIG. 4.

The source 402 may transmit the original data packet 406 to the window adjustment system 210. The original data packet 406 may include an original window size. The original window size may correspond to an amount of capacity in a receive buffer of the source 402 that is reserved for a session between the source 402 and the destination 404. In some cases, the original window size may be specified in a window size parameter of a TCP header of the original data packet 406. The original data packet 406 may be addressed to the destination 404. For instance, an address (e.g., IP address, MAC address, or the like) and/or port number of the destination 404 may be included in a header (e.g., the TCP header and/or an IP header) of the original data packet 406.

In response to receiving the original data packet 406, the window adjustment system 210 may at least attempt to access an entry of the QoE database 214 based on an application identifier 502. The application identifier 502 may correspond to an application and/or application server associated with the session between the source 402 and the destination 404. For example, either one of the source 402 or the destination 404 may be the application server. In some cases, the window adjustment system 210 may derive the application identifier 502 based on the original data packet 406. For example, the application identifier 502 may be the address and/or port number of the destination 404. In some cases, the original data packet 406 may include an address and/or port number of the source 402. The application identifier 502 may be the address and/or port number of the source 402. The QoE database 214 may include a table with multiple entries corresponding to different sessions, applications, and/or application servers. The table may be indexed according to application identifier. Accordingly, the application identifier 502 can be used to identify the entry in the table that corresponds to the application associated with the session between the source 402 and the destination 404.

In some cases, the QoE database 214 may return a QoE priority 504 to the window adjustment system 210. The QoE priority 504, for instance, may indicate the sensitivity of the session to QoE. In various cases, the QoE priority 504 may be stored in the entry of the QoE database 214 that corresponds to the application identifier 502.

The window adjustment system 210 may transmit, to the source 402, a window request 506. The window request 506 may specify a different window size than the original window size specified in the original first data packet 406. The window adjustment system 210 may generate the window request 506 based on the QoE priority 506. For example, if the QoE priority 506 is above or equal to a particular threshold, such that the QoE priority 506 is relatively high, the window adjustment system 210 may generate the window request 506 to indicate a larger window size than the window size specified in the original first data packet 406. In some instances, if the QoE priority 506 is less than to the particular threshold, such that the QoE priority 506 is relatively low, the window adjustment system 210 may generate the window request 506 to indicate a smaller window size than the window size specified in the original first data packet 406.

In turn, the source 402 may transmit a window confirmation 508 to the window adjustment system 210. For example, the source 402 may determine that the window size specified in the window request 506 is acceptable, which may be indicated in the window confirmation 508. In some cases, the source 402 may determine that the window size specified in the window request 506 is unacceptable, and may indicate a different window size in the window confirmation 508. According to various implementations, the window adjustment system 210 can derive a modified window size, which is suitable for the source 402, The window adjustment system 210 may transmit the modified first data packet 412 to the destination 404. The modified first data packet 412 may include at least some data included in the original first data packet 406. For example, the modified first data packet 412 may include the payload of the original first data packet 406. However, the modified first data packet 412 may include the modified window size.

In response to receiving the modified first data packet 412, the destination 404 may transmit the second data packet(s) 414 to the source 402. A size of the second data packet(s) 414 may correspond to the modified window size specified in the modified first data packet 412. For example, a number of bytes included in the second data packet(s) 414 may not exceed a number of bytes corresponding to the modified window size.

Figure 6:
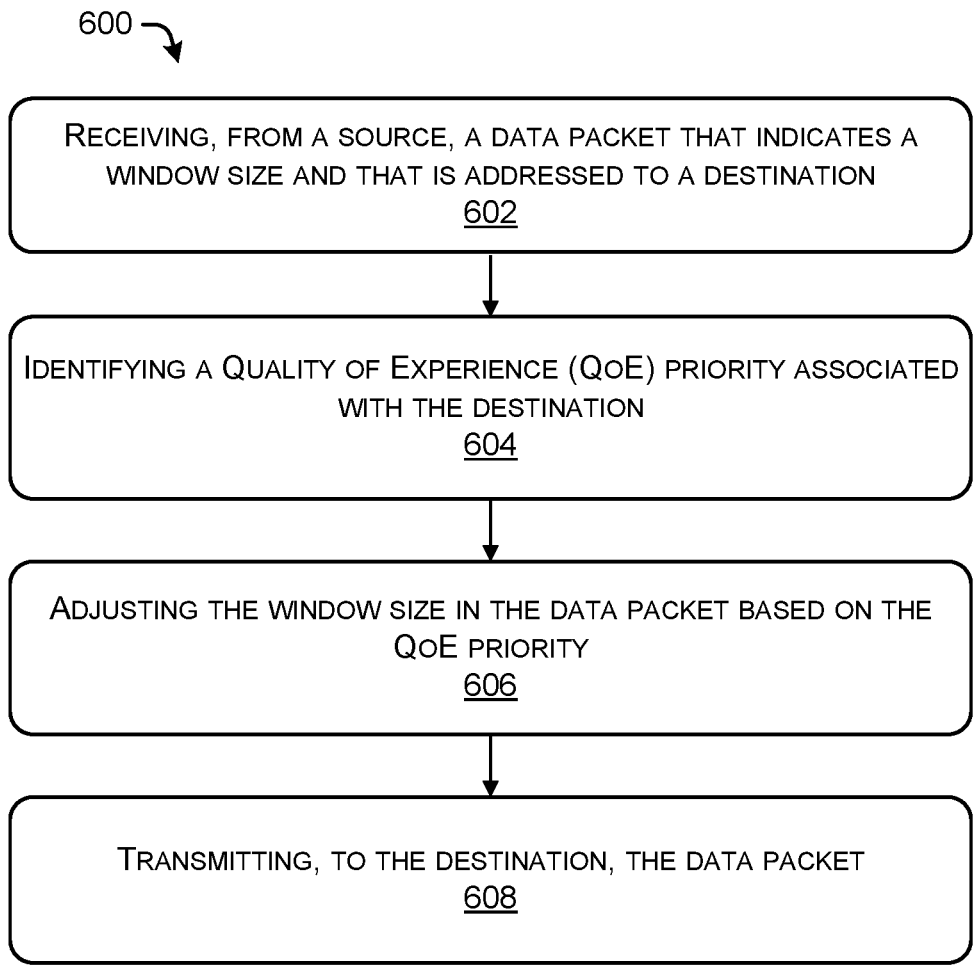
FIG. 6 illustrates an example process for adjusting window sizes based on QoE sensitivity.
Figure 7:
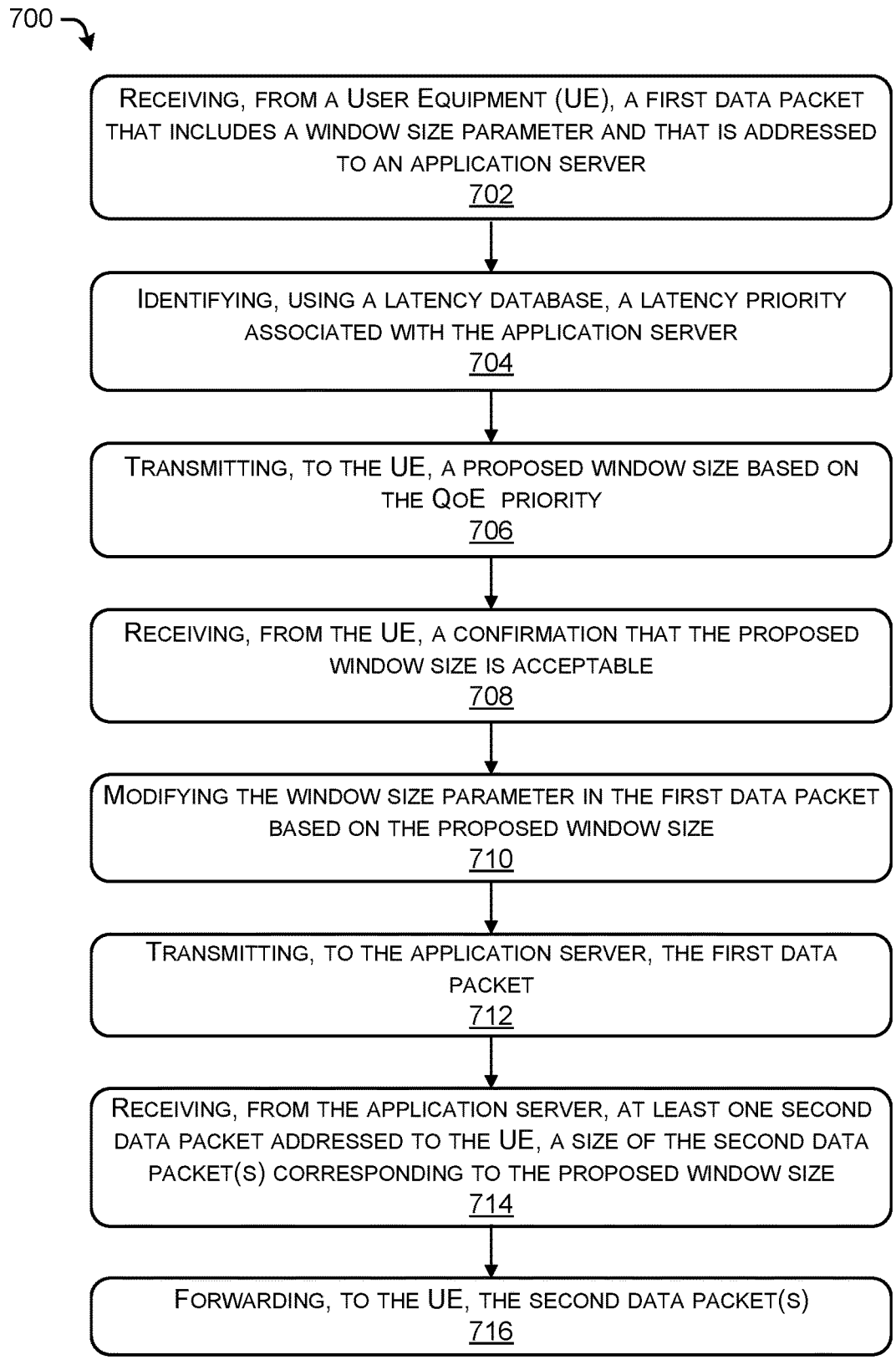
FIG. 7 illustrates an example process for negotiating window sizes based on QoE sensitivity.

FIGS. 6 and 7 illustrate example processes in accordance with embodiments of the present disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process 600 for adjusting window sizes based on QoE sensitivity. In various cases, the process 600 may be performed by a Radio Access Network (e.g., the RAN 112 described above) and/or a component of a core network (e.g., a component of the core network 110, such as the User Plane Function (UPF) or Packet Data Network (PDN) Gateway (PGW) 218 described above).

At 602, the process 600 includes receiving, from a source, a data packet that includes a window size and that is addressed to a destination. In some cases, the source may be a User Equipment (UE) or an application server. Further, in various cases, the destination may be a UE or an application server. In some cases, the data packet may be included in a Protocol Data Unit (PDU), such as a General Packet Radio Service (GPRS) Tunneling Protocol (GTP) PDU or a Packet Data Convergence Protocol (PDCP) PDU.

At 604, the process 600 includes identifying a QoE priority associated with the destination. The QoE priority may correspond to the sensitivity of data in a session between the source and the destination to QoE. In some cases, the QoE priority can be obtained by accessing a database. The database can include multiple entries corresponding to various different applications. In some cases, an application associated with the session can be determined based on a source and/or a destination of the data packet. For instance, the application server can be identified based on the source and/or destination address in a header (e.g., an Internet Protocol (IP) header) of the data packet.

At 606, the process 600 includes adjusting the window size in the data packet based on the QoE priority. In some cases, the QoE priority can be compared to a threshold. If the QoE priority is below the threshold, the window size may be decreased. If the QoE priority is above the threshold, the window size may be increased, in some cases.

At 608, the process 600 includes transmitting the data packet to the destination. In some cases, upon receiving the data packet, the destination may transmit, to the source, one or more additional data packets, wherein a size of the additional data packet(s) may be less than or equal to the window size.

FIG. 7 illustrates an example process 700 for negotiating window sizes based on QoE sensitivity. In various cases, the process 700 may be performed by a Radio Access Network (e.g., the RAN 112 described above) and/or a component of a core network (e.g., a component of the core network 110, such as the User Plane Function (UPF) or Packet Data Network (PDN) Gateway (PGW) 218 described above).

At 702, the process 700 includes receiving, from a User Equipment (UE), a first data packet that includes a window size parameter and that is addressed to an application server. In some cases, the data packet may be included in a Protocol Data Unit (PDU), such as a General Packet Radio Service (GPRS) Tunneling Protocol (GTP) PDU or a Packet Data Convergence Protocol (PDCP) PDU.

At 704, the process 700 includes identifying a QoE priority associated with the application server using a QoE database. The QoE priority may correspond to the sensitivity of data in a session between the source and the destination to QoE. In some cases, the QoE priority can be obtained by accessing the QoE database. The database can include multiple entries corresponding to various different applications. In some cases, an application associated with the session can be determined based on a source and/or a destination of the data packet. For instance, the application server can be identified based on the source and/or destination address in a header (e.g., an IP header) of the first data packet.

At 706, the process 700 includes transmitting a proposed window size to the UE based on the QoE priority. In some cases, the QoE priority can be compared to a threshold. If the QoE priority is below the threshold, the proposed window size may be lower than the original window size in the first data packet. If the QoE priority is above the threshold, the window size may be larger than the original window size in the first data packet.

At 708, the process 700 includes receiving, from the UE, a confirmation that the proposed window size is acceptable. At 710, the process 700 includes modifying the window size in the first data packet based on the proposed window size. At 712, the process 700 includes transmitting the first data packet to the application server. As transmitted, the first data packet may indicate the proposed window size.

At 714, the process 700 includes receiving, from the application server, at least one second data packet addressed to the UE. A size of the second data packet(s) may correspond to the proposed window size. For example, the size of the second data packet(s) may be less than or equal to the proposed window size.

At 716, the process 700 includes forwarding the second data packet(s) to the UE. According to some cases, the second data packet(s) can be forwarded in at least one of a Packet Data Convergence Protocol (PDCP) PDU or a General Packet Radio Service (GPRS) Tunneling Protocol (GTP) PDU.

Figure 8:
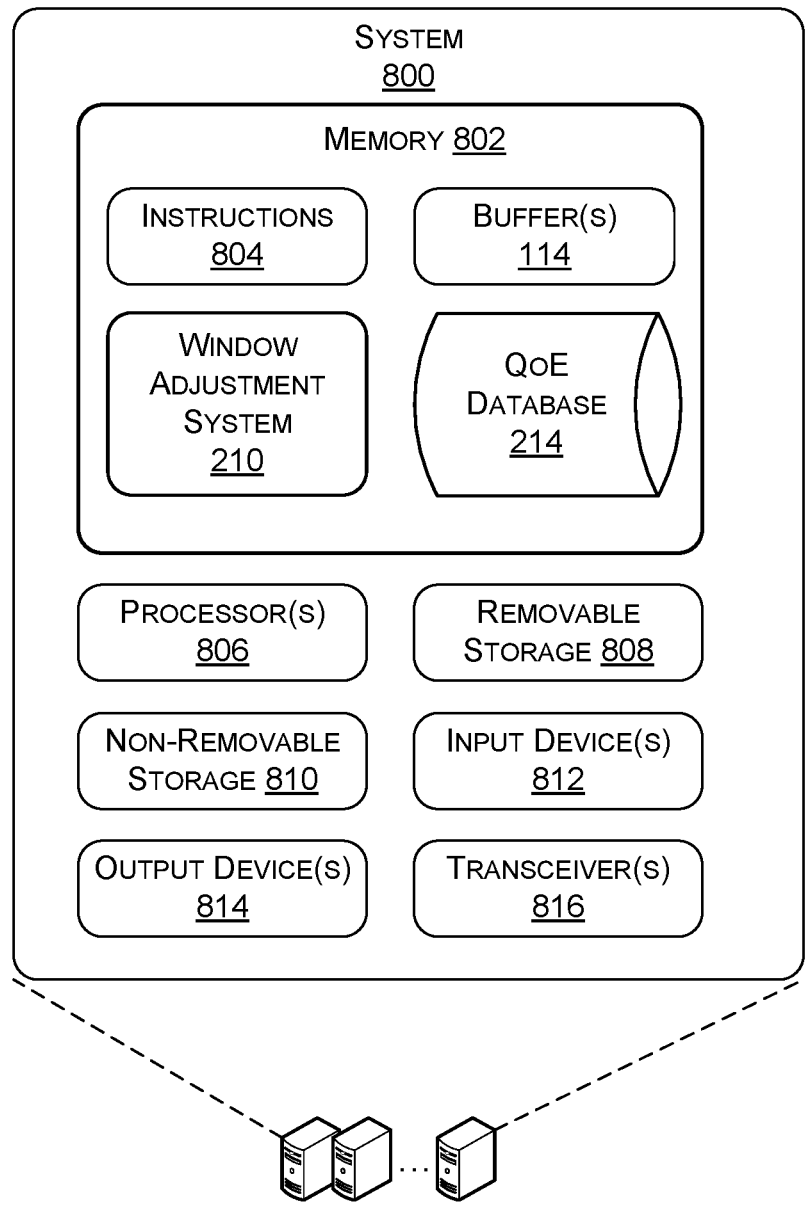
FIG. 8 illustrates at least one example device configured to adjust window sizes based on QoE sensitivity

FIG. 8 illustrates at least one example device 800 configured to adjust window sizes based on QoE sensitivity. In some embodiments, some or all of the functionality discussed in connection with FIGS. 1-7 can be implemented in the device(s) 800. Further, the device(s) 800 can be implemented as one or more server computers, at least one network element on a dedicated hardware, as at least one software instance running on a dedicated hardware, or as at least one virtualized function instantiated on an appropriate platform, such as a cloud infrastructure, and the like. It is to be understood in the context of this disclosure that the device(s) 800 can be implemented as a single device or as a plurality of devices with components and data distributed among them.

As illustrated, the device(s) 800 can include a memory 802. In various embodiments, the memory 802 is volatile (including a component such as Random Access Memory (RAM)), non-volatile (including a component such as Read Only Memory (ROM), flash memory, etc.) or some combination of the two.

The memory 802 may include various components, such as instructions 804, the buffer(s) 114, the window adjustment system 210, and the QoE database 214. The instructions 804 can comprise methods, threads, processes, applications, or any other sort of executable instructions. The instructions 804, and various other elements stored in the memory 802, can also include files and databases.

The memory 802 may include various instructions (e.g., the instructions 804), which can be executed by at least one processor 806 to perform operations. In some embodiments, the processor(s) 806 includes a Central Processing Unit (CPU), a Graphics Processing Unit (GPU), or both CPU and GPU, or other processing unit or component known in the art.

The device(s) 800 can also include additional data storage devices (removable and/or non-removable) such as, for example, magnetic disks, optical disks, or tape. Such additional storage can include removable storage 808 and non-removable storage 810. Tangible computer-readable media can include volatile and nonvolatile, removable and non-removable media implemented in any method or technology for storage of information, such as computer readable instructions, data structures, program modules, or other data. The memory 802, removable storage 808, and non-removable storage 810 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 800. Any such tangible computer-readable media can be part of the device(s) 800.

The device(s) 800 also can include input device(s) 812, such as a keypad, a cursor control, a touch-sensitive display, voice input device, etc., and output device(s) 814 such as a display, speakers, printers, etc. These devices are well known in the art and need not be discussed at length here. In particular implementations, a user can provide input to the device(s) 800 via a user interface associated with the input device(s) 812 and/or the output device(s) 814.

The device(s) 800 can also include one or more wired or wireless transceiver(s) 816. For example, the transceiver(s) 816 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 816 can utilize Multiple-Input/Multiple-Output (MIMO) technology. The transceiver(s) 816 can include any sort of wireless transceivers capable of engaging in wireless, Radio Frequency (RF) communication. The transceiver(s) 816 can also include other wireless modems, such as a modem for engaging in Wi-Fi, WiMAX, Bluetooth, or infrared communication.

In some implementations, the transceiver(s) 816 can be used to communicate between various functions, components, modules, or the like, that are comprised in the devices 800. For instance, the transceiver(s) 816 can be used to transmit data between the device(s) 800 and an external User Equipment (UE), or the like.

EXAMPLE CLAUSES

The following clauses provide various examples of implementations of the present disclosure.

1. A Radio Access Network (RAN) including at least one processor; and memory storing: a buffer storing QoE-sensitive data addressed to a first User Equipment (UE); and instructions that, when executed by the RAN, cause the RAN to perform operations including: receiving, from second UE over a radio interface, a first Packet Data Convergence Protocol (PDCP) Protocol Data Unit (PDU) including a first data packet that indicates a window size and that is addressed to an application server; identifying a QoE priority associated with the application server; determining that the QoE priority is below a threshold; reducing the window size indicated by the first data packet based on the QoE priority; in response to reducing the window size, encapsulating the first data packet in a first General Packet Radio Service (GPRS) Tunneling Protocol (GTP) packet; transmitting, to a core network and toward the application server, the first GTP packet; receiving, from the core network, at least one second GTP packet, a size of the at least one second GTP packet being smaller than the window size; storing, in the buffer, non-QoE-sensitive data in the at least one second GTP packet with the QoE-sensitive data; transmitting, to the first UE over the radio interface, at least one second PDCP PDU including the QoE-sensitive data; and transmitting, to the second UE over the radio interface, at least one third PDCP PDU including the non-QoE-sensitive data in the at least one second GTP packet.

2. The system of clause 1, wherein the memory includes a database, and wherein identifying the QoE priority includes: identifying, in a header of the first data packet, an identifier of the application server; identifying an entry of the database based on the identifier of the application server; and identifying the QoE priority based on the entry.

3. The system of clause 1 or 2, wherein the operations further include: receiving, from the second UE over the radio interface, a fourth PDCP PDU including an acknowledgement of the non-QoE-sensitive data; and transmitting, to the core network and toward the application server, a third GTP packet including the acknowledgement.

4. A method including: receiving, from a first device, a data packet that indicates a window size and that is addressed to a second device; identifying a QoE priority associated with the second device; adjusting the window size indicated by the data packet based on the QoE priority; and in response to adjusting the window size, transmitting, to the second device, the data packet.

5. The method of clause 4, wherein the data packet includes a Transmission Control Protocol (TCP) segment that indicates the window size.

6. The method of clause 4 or 5 wherein receiving the data packet includes receiving a Protocol Data Unit (PDU) including the data packet, the PDU being at least one of a Packet Data Convergence Protocol (PDCP) PDU or a General Packet Radio Service (GPRS) Tunneling Protocol (GTP) PDU.

7. The method of any one of clauses 4 to 6, wherein identifying the QoE priority includes: identifying, in a header of the data packet, an identifier of the second device; identifying an entry of a database based on the identifier of the second device; and identifying the QoE priority based on the entry.

8. The method of any one of clauses 4 to 7, further including: determining that the QoE priority is below a threshold, wherein adjusting the window size includes reducing the window size.

9. The method of any one of clauses 4 to 7, further including: determining that the QoE priority is above a threshold, wherein adjusting the window size includes increasing the window size.

10. The method of any one of clauses 4 to 9, further including: transmitting, to the first device, a request indicating a proposed window size; and receiving, from the first device, a confirmation that the proposed window size is acceptable, wherein adjusting the window size includes converting the window size to the proposed window size.

11. The method of any one of clauses 4 to 10, the data packet being a first data packet, the method further including: receiving, from the second device, at least one second data packet, a size of the at least one second data packet being less than the window size indicated in the first data packet; forwarding, to the first device, the at least one second data packet; receiving, from the first device, an acknowledgement of the at least one second data packet; and forwarding, to the second device, the acknowledgement.

12. The method of any one of clauses 4 to 11, further including: determining that a buffer of a Radio Access Network (RAN) serving the first device is congested.

13. A system including: at least one processor; and memory storing instructions that, when executed by the system, cause the system to perform operations including: receiving, from a first device, a data packet that indicates a window size and that is addressed to a second device; identifying a QoE priority associated with the second device; adjusting the window size indicated by the data packet based on the QoE priority; and in response to adjusting the window size, transmitting, to the second device, the data packet.

14. The system of clause 13, wherein the data packet includes a Transmission Control Protocol (TCP) segment that indicates the window size.

15. The system of clause 13 or 14, wherein the system is a Packet Data Network (PDN) Gateway (PGW) or a User Plane Function (UPF), and wherein receiving the data packet includes receiving a Packet Data Convergence Protocol (PDCP) Protocol Data Unit (PDU) that includes the data packet.

16. The system of any one of clauses 13 to 15, wherein the system is a Radio Access Network (RAN), and wherein receiving the data packet includes receiving a General Packet Radio Service (GPRS) Tunneling Protocol (GTP) Protocol Data Unit (PDU) that includes the data packet.

17. The system of any one of clauses 13 to 16, wherein the memory includes a database, and wherein identifying the QoE priority includes: identifying, in a header of the data packet, an identifier of the second device; identifying an entry of the database based on the identifier of the second device; and identifying the QoE priority based on the entry.

18. The system of any one of clauses 13 to 17, wherein the operations further include: determining that the QoE priority is below a threshold; identifying a proposed window size that is smaller than the window size indicated by the data packet; transmitting, to the first device, the proposed window size; and receiving, from the first device, a confirmation that the proposed window size is acceptable, wherein adjusting the window size includes reducing the window size indicated by the data packet to the proposed window size.

19. The system of any one of clauses 13 to 18, the data packet being a first data packet, the operations further including: receiving, from the second device, at least one second data packet, a size of the at least one second data packet corresponding to the window size indicated by the first data packet; forwarding, to the first device, the at least one second data packet; receiving, from the first device, an acknowledgement of the at least one second data packet; and forwarding, to the second device, the acknowledgement.

20. The system of any one of clauses 13 to 19, wherein the operations further include: determining that a buffer of a Radio Access Network (RAN) connected to the first device is congested.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system including a Radio Access Network (RAN) comprising:
 at least one processor; and
 memory storing:
  a buffer storing Quality of Experience-sensitive (QoE-sensitive) data addressed to a first User Equipment (UE); and
  instructions that, when executed by the RAN, cause the RAN to perform operations comprising:
   receiving, from second UE over a radio interface, a first Packet Data Convergence Protocol (PDCP) Protocol Data Unit (PDU) comprising a first data packet that indicates a window size and that is addressed to an application server;
   identifying a QoE priority associated with the application server;
   determining that the QoE priority is below a threshold;
   reducing the window size indicated by the first data packet based on the QoE priority;

in response to reducing the window size, encapsulating the first data packet in a first General Packet Radio Service (GPRS) Tunneling Protocol (GTP) packet;
transmitting, to a core network and toward the application server, the first GTP packet;
receiving, from the core network, at least one second GTP packet, a size of the at least one second GTP packet being smaller than the window size;
storing, in the buffer, non-QoE-sensitive data in the at least one second GTP packet with the QoE-sensitive data;
transmitting, to the first UE over the radio interface, at least one second PDCP PDU comprising the QoE-sensitive data; and
transmitting, to the second UE over the radio interface, at least one third PDCP PDU comprising the non-QoE-sensitive data in the at least one second GTP packet.

2. The system of claim 1, wherein the memory comprises a database, and
wherein identifying the QoE priority comprises:
identifying, in a header of the first data packet, an identifier of the application server;
identifying an entry of the database based on the identifier of the application server; and
identifying the QoE priority based on the entry.

3. The system of claim 1, wherein the operations further comprise:
receiving, from the second UE over the radio interface, a fourth PDCP PDU comprising an acknowledgement of the non-QoE-sensitive data; and
transmitting, to the core network and toward the application server, a third GTP packet comprising the acknowledgement.

4. A method performed by a Radio Access Network (RAN) comprising:
storing a buffer storing Quality of Experience-sensitive (QoE-sensitive) data addressed to a first User Equipment (UE);
receiving, from a from second UE over a radio interface, a first Packet Data Convergence Protocol (PDCP) Protocol Data Unit (PDU) comprising a first data packet that indicates a window size and that is addressed to an application server;
identifying a QoE priority associated with the application server;
determining that the QoE priority is below a threshold;
reducing the window size indicated by the first data packet based on the QoE priority;
in response to reducing the window size, encapsulating the first data packet in a first General Packet Radio Service (GPRS) Tunneling Protocol (GTP) packet;
transmitting, to a core network and toward the application server, the first GTP packet;
receiving, from the core network, at least one second GTP packet, a size of the at least one second GTP packet being smaller than the window size;
storing, in the buffer, non-QoE-sensitive data in the at least one second GTP packet with the QoE-sensitive data;
transmitting, to the first UE over the radio interface, at least one second PDCP PDU comprising the QoE-sensitive data; and
transmitting, to the second UE over the radio interface, at least one third PDCP PDU comprising the non-QoE-sensitive data in the at least one second GTP packet.

5. The method of claim 4, wherein identifying the QoE priority comprises:
identifying, in a header of the first data packet, an identifier of the application server;
identifying an entry of a database based on the identifier of the application server; and
identifying the QoE priority based on the entry.

6. The method of claim 4, further comprising:
receiving, from the second UE over the radio interface, a fourth PDCP PDU comprising an acknowledgement of the non-QoE-sensitive data; and
transmitting, to the core network and toward the application server, a third GTP packet comprising the acknowledgement.

7. The method of claim 4, wherein the first data packet comprises a Transmission Control Protocol (TCP) segment that indicates the window size.

8. The method of claim 4, further comprising:
transmitting, by the RAN to the first UE, a request indicating a proposed window size; and
receiving, by the RAN from the first UE, a confirmation that the proposed window size is acceptable,
wherein reducing the window size comprises converting the window size to the proposed window size.

9. The method of claim 4, further comprising:
receiving, by the RAN from the second UE, at least one second data packet, a size of the at least one second data packet being less than the window size indicated in the first data packet;
forwarding, by the RAN to the first UE, the at least one second data packet;
receiving, by the RAN from the first UE, an acknowledgement of the at least one second data packet; and
forwarding, by the RAN to the second UE, the acknowledgement.

10. The method of claim 4, further comprising:
determining that a buffer of the RAN is congested, the RAN serving the first UE,
wherein reducing the window size is further based on determining that the buffer is congested.

11. The method of claim 4, further comprising:
receiving, from the second UE, at least one second data packet, a size of the at least one second data packet being equal to or less than the window size indicated in the first data packet transmitted to the second UE, the at least one second data packet comprising the non-QoE-sensitive data;
storing, in the buffer, the at least one of non-URLLC data or non-GBR data; and
transmitting, to the first UE, the at least one second data packet.

12. The method of claim 11, further comprising storing, in the buffer, the non-URLLC data.

13. The method of claim 11, further comprising storing, in the buffer, the non-GBR data.

14. A Radio Access Network (RAN) that comprises:
at least one processor; and
memory storing:
a buffer storing Quality of Experience-sensitive (QoE-sensitive) data addressed to a first User Equipment (UE); and
instructions that, when executed by the RAN, cause the RAN to perform operations comprising:
receiving, from second UE over a radio interface, a first Packet Data Convergence Protocol (PDCP) Protocol Data Unit (PDU) comprising a first data packet that indicates a window size and that is addressed to an application server;

identifying a QoE priority associated with the application server;

determining that the QoE priority is below a threshold;

reducing the window size indicated by the first data packet based on the QoE priority;

in response to reducing the window size, encapsulating the first data packet in a first General Packet Radio Service (GPRS) Tunneling Protocol (GTP) packet;

transmitting, to a core network and toward the application server, the first GTP packet;

receiving, from the core network, at least one second GTP packet, a size of the at least one second GTP packet being smaller than the window size;

storing, in the buffer, non-QoE-sensitive data in the at least one second GTP packet with the QoE-sensitive data;

transmitting, to the first UE over the radio interface, at least one second PDCP PDU comprising the QoE-sensitive data; and transmitting, to the second UE over the radio interface, at least one third PDCP PDU comprising the non-QoE-sensitive data in the at least one second GTP packet.

15. The RAN of claim 14, wherein the memory comprises a database, and wherein identifying the QoE priority comprises:

identifying, in a header of the first data packet, an identifier of the application server;

identifying an entry of the database based on the identifier of the application server; and identifying the QoE priority based on the entry.

16. The RAN of claim 14, wherein the operations further comprise:

receiving, from the second UE over the radio interface, a fourth PDCP PDU comprising an acknowledgement of the non-QoE-sensitive data; and transmitting, to the core network and toward the application server, a third GTP packet comprising the acknowledgement.

17. The RAN of claim 14, wherein the first data packet comprises a Transmission Control Protocol (TCP) segment that indicates the window size.

18. The RAN of claim 14, wherein the operations further comprise:

transmitting, by the RAN to the first UE, a request indicating a proposed window size; and receiving, by the RAN from the first UE, a confirmation that the proposed window size is acceptable, wherein reducing the window size comprises converting the window size to the proposed window size.

19. The RAN of claim 14, wherein the operations further comprise:

receiving, by the RAN from the second UE, at least one second data packet, a size of the at least one second data packet being less than the window size indicated in the first data packet;

forwarding, by the RAN to the first UE, the at least one second data packet;

receiving, by the RAN from the first UE, an acknowledgement of the at least one second data packet; and forwarding, by the RAN to the second UE, the acknowledgement.

20. The RAN of claim 14, wherein the operations further comprise:

determining that a buffer of the RAN is congested, the RAN serving the first UE, wherein reducing the window size is further based on determining that the buffer is congested.

* * * * *